United States Patent
Evangelopoulos

(10) Patent No.: US 12,530,655 B2
(45) Date of Patent: Jan. 20, 2026

(54) PROACTIVE REQUEST COMMUNICATION SYSTEM WITH IMPROVED DATA PREDICTION USING ARTIFICIAL INTELLIGENCE

(71) Applicant: 7-Eleven, Inc., Irving, TX (US)

(72) Inventor: Nicholas E. Evangelopoulos, Denton, TX (US)

(73) Assignee: 7-Eleven, Inc., Irving, TX (US)

(\*) Notice: Subject to any disclaimer, the term of this patent is extended or adjusted under 35 U.S.C. 154(b) by 1069 days.

(21) Appl. No.: 17/454,573

(22) Filed: Nov. 11, 2021

(65) Prior Publication Data

US 2023/0144718 A1    May 11, 2023

(51) Int. Cl.
*G06Q 10/087* (2023.01)
*G06N 5/04* (2023.01)
*G06Q 10/083* (2024.01)

(52) U.S. Cl.
CPC ............. *G06Q 10/087* (2013.01); *G06N 5/04* (2013.01); *G06Q 10/083* (2013.01)

(58) Field of Classification Search
CPC .... G06Q 10/087; G06Q 10/083; G06Q 10/08; G06N 5/04
USPC .......................................................... 705/28
See application file for complete search history.

(56) References Cited

U.S. PATENT DOCUMENTS

2020/0175464 A1\* 6/2020 Ferguson ........... G06Q 30/0206
2021/0241210 A1\* 8/2021 Esrubilsky ......... G06Q 30/0185

OTHER PUBLICATIONS

Evangelopoulos, N. E., "Data Prediction and Proactive Request System Using Artificial Intelligence," U.S. Appl. No. 17/454,581, filed Nov. 11, 2021, 2021, 50 pages.
Evangelopoulos, N. E., "Proactive Request Communication System With Improved Data Prediction Based On Inferred Events", U.S. Appl. No. 17/646,950, filed Jan. 4, 2022, 93 pages.
Evangelopoulos, N. E., "Proactive Request Communication System With Improved Data Prediction Based On Anticipated Events", U.S. Appl. No. 17/646,961, filed Jan. 4, 2022, 92 pages.
Evangelopoulos, N. E., "Proactive Request Communication System With Improved Data Prediction With Time of Day Adjustment", U.S. Appl. No. 17/646,972, filed Jan. 4, 2022, 92 pages.
Evangelopoulos, N. E., "Proactive Request Communication System With Improved Data Prediction Using Event-To-Status Transformation", U.S. Appl. No. 17/646,979, filed Jan. 4, 2022, 92 pages.

\* cited by examiner

*Primary Examiner* — Ariel J Yu
*Assistant Examiner* — Denisse Y Ortiz Roman
(74) *Attorney, Agent, or Firm* — Baker Botts L.L.P.

(57) ABSTRACT

An event tracking subsystem detects events for the removal of items at a plurality of locations. A data prediction subsystem receives event data based on the detected events that indicates an amount of an item removed from each of the plurality of locations over a previous period of time. The data prediction subsystem determines a prediction data value for each item at each of the plurality of locations. The prediction data is used to proactively request items with improved communication and computational efficiency.

24 Claims, 8 Drawing Sheets

| DAY | PREDICTION | CE | ROUNDED PREDICTION | CONVENTIONAL ROUNDING |
|---|---|---|---|---|
| 11/1/19 | 1.13 | 0.13 | 1 | 1 |
| 11/2/19 | 0.41 | -0.46 | 1 | 0 |
| 11/3/19 | 0.41 | -0.05 | 0 | 0 |
| 11/4/19 | 0.79 | -0.26 | 1 | 1 |
| 11/5/19 | 0.41 | 0.15 | 0 | 0 |
| 11/6/19 | 0.41 | -0.44 | 1 | 0 |
| 11/7/19 | 0.41 | -0.03 | 0 | 0 |
| 11/8/19 | 0.41 | 0.38 | 0 | 0 |
| 11/9/19 | 1.41 | -0.21 | 2 | 1 |
| 11/10/19 | 1.41 | 0.2 | 1 | 1 |
| 11/11/19 | 0.41 | -0.39 | 1 | 0 |
| 11/12/19 | 0.41 | 0.02 | 0 | 0 |
| 11/13/19 | 0.41 | 0.43 | 0 | 0 |
| 11/14/19 | 0.41 | -0.16 | 1 | 0 |
| TOTAL: | 8.84 | | 9 | 4 |

FIG. 5

PROACTIVE REQUEST COMMUNICATION SYSTEM WITH IMPROVED DATA PREDICTION USING ARTIFICIAL INTELLIGENCE

TECHNICAL FIELD

The present disclosure relates generally to data and request communication technology, and more specifically, to a proactive request communication system with improved data prediction using artificial intelligence.

BACKGROUND

Computer systems may be used to store a record of previous and ongoing events. For example, if an object or item is removed from a given location, this event can be recorded. There exists a need for improved tools for using such data to predict related future events more efficiently and reliably.

SUMMARY

Previous data prediction technology suffers from various drawbacks and limitations. For example, previous data prediction technology often bases a prediction for an upcoming time period (e.g., for the next week) on events that occurred during the same time period in the previous year. Such previous technology fails to capture recent trends or changes that are likely to impact events in the future. For example, recent changes in event patterns may suggest a large departure from the characteristics of the same time period the previous year, but previous technology fails to capture this. Previous data prediction technology also lacks tools for more accurate and reliable predictions when a large amount of information is not available for the predicted event. For instance, if an event only happens intermittently (e.g., either once or zero times per day), previous technology generally cannot reliably predict how these events are likely to proceed on a day-by-day basis in the future. This results in a large number of low-activity events that cannot be predicted using previous data prediction technology.

Certain embodiments of this disclosure may be integrated into the practical application of a data prediction and proactive request system that provides improvements to previous technology, including those identified above. The disclosed system provides several practical applications and associated technical advantages, which include: (1) the ability to predict future events more accurately and dynamically than was previously possible, such that resource consumption is decreased when proactively responding to the events; (2) an improved prediction process based on a triple moving average that combines highly relevant yet potentially fluctuating location-specific components and more stable, yet still relevant, components based on a location zone and item type associated with the prediction; (3) the ability to more reliably predict events at locations which might have otherwise been considered outliers; and (4) an improved rounding process that transforms non-integer prediction values into readily interpretable integer values with little or no overall rounding error.

Through these and other technical improvements provided by this disclosure, the disclosed system and associated devices provide more accurate and reliable data prediction than was previously possible. Accordingly, this disclosure improves the function of computer systems and related technology used for data prediction. Furthermore, this improved data prediction also provides downstream improvements to technology used to proactively respond to predicted events. For example, this disclosure allows resources for proactively responding to predictions to be used more efficiently than was possible using previous technology. For instance, if a response to an event indicates items should be requested and transported from another location, previous technology that inaccurately predicts a need of these items resulted in wasted computer resources (e.g., network bandwidth, processing resources, and memory resources) used by systems to initiate and coordinate this transportation in addition to other wasted infrastructure resources in transporting unneeded items. For example, if previous technology provides an under-prediction of future need, too few items may be requested initially, resulting in the need for supplemental requests and the concomitant waste of communication resources to make the request, computing resources to coordinate item transport, physical resources to transport the items multiple times, etc. Certain embodiments of the present disclosure may include some, all, or none of these advantages. These advantages and other features will be more clearly understood from the following detailed description taken in conjunction with the accompanying drawings and claims.

In one embodiment, a system includes a data prediction subsystem with a network interface configured to receive event data indicating an amount of an item removed from each of a plurality of locations over a previous period of time. A memory of the data prediction subsystem is operable to store the received event data. A processor of the data prediction subsystem is communicatively coupled to the network interface and the memory. The data prediction subsystem determines a set of first moving averages. Each of the first moving averages includes a weighted average of the amount of the item removed from a corresponding location of the plurality of locations each day during a previous time interval. Using the first moving averages, second moving averages are determined that are aggregated by item. Using the first moving averages, third moving averages are determined that are aggregated by location. A prediction data value is determined for the item at each of the plurality of locations using the first moving averages, second moving averages, and third moving averages (e.g., by determining a triple moving average). An item request device associated with a location of the plurality of locations may receive the prediction data value associated with the location of the item request device can cause presentation of a recommendation based on the received prediction data value.

In another embodiment, a system includes a data prediction subsystem with a memory that stores instructions for implementing a process for rounding with cumulative error redistribution and a first processor communicatively coupled to the memory. The data prediction subsystem receives event data indicating an amount of an item removed from each of a plurality of locations over a previous period of time. For each location of the plurality of locations, prediction data is determined using the event data. The prediction data includes, for each day over a future period of time, a non-integer value indicating an anticipated amount of the item that will be removed from the location. Using the process for rounding with cumulative error redistribution, an integer value is determined for each day of the future period of time, based at least in part on each non-integer value of the prediction data for the day, thereby determining rounded prediction data. An item request device associated with a location of the plurality of locations may receive at least a portion of the rounded prediction data associated with the location of the item request device and cause presentation of a recommendation based on the received portion of the rounded prediction data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table illustrating an example result of the improved rounding process of this disclosure;

DETAILED DESCRIPTION

Figure 1A:
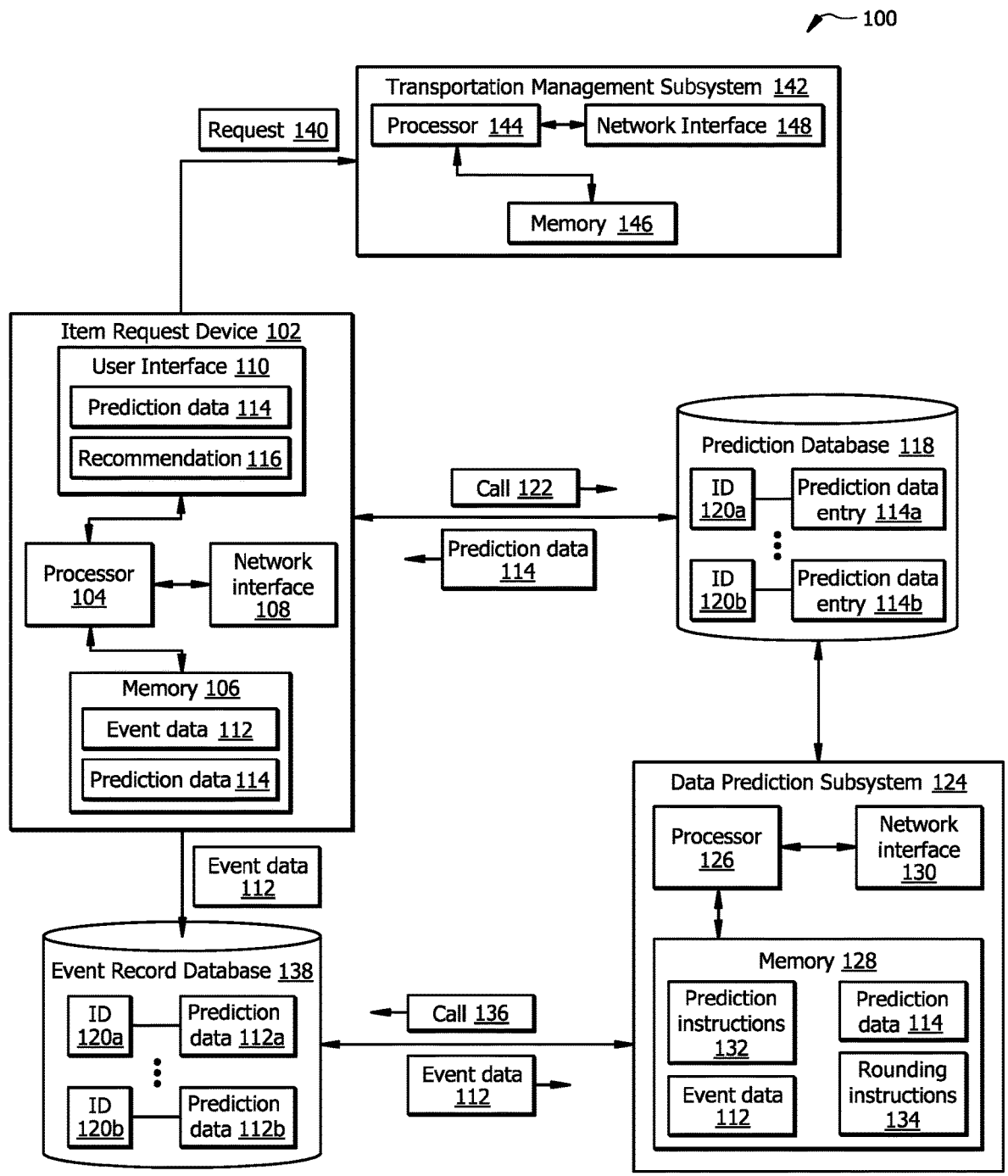
FIG. 1A is a schematic diagram of an embodiment of an example data prediction and proactive request system.

In certain embodiments, the data prediction and proactive request system of this disclosure may be used to predict events corresponding to removing items from a location, such that the number of items that needs to be obtained in order to efficiently replace items can be determined. In such embodiments, prediction data can be used to more reliably replace items expected to be removed than was possible using previous technology. The system of this disclosure may decrease or eliminate the waste of resources at multiple points in this process. For instance, previous technology that provides less accurate prediction data may result in an excessive number of perishable items being transported for a period of time, such that some of the items are never able to be used. The system of this disclosure may prevent or eliminate such waste. The system of this disclosure may decrease consumption by more accurately replacing items. In general, predictions may be determined for a large number of items over a large number of locations, such that the network bandwidth, data storage, and data processing resources involved with initiating and completing item transport can be considerable. The improved predictions provided by this disclosure may reduce or eliminate the waste of these resources, as described with respect to the examples below.

As one example, the improved data prediction and proactive request system may result in significantly fewer unnecessary communications to the correct number of items that will be needed at each of many locations, resulting in improved network bandwidth utilization to communicate item requests. For instance, previous technology with less accurate prediction data may provide under-prediction for the number items needed in the future at a given location, resulting in not enough items being requested in an initial communication. Supplemental communications will then be needed to retroactively request more items, resulting in wasted communication resources, such as network bandwidth and memory to store data for each communication. The improved prediction data of the data prediction and proactive request system of this disclosure helps prevent the waste of these communication resources by ensuring that the correct requests are made initially, such that there is decreased waste of communication resources to make supplemental requests. For at least these reasons, this disclosure may be integrated into the practical application of a data prediction and proactive request system that improves the technology used for communicating requests for items.

As another example, the data prediction and proactive request system may also provide for the decreased use of computational resources for coordinating the transportation of requested items. A large amount of computational resources are generally expended to coordinate timing and routes for transporting items. When the improved prediction data of this disclosure is used, fewer item transportations are needed. For example, because fewer supplemental requests are sent, fewer transportation events may be needed to obtain a given item. As such, the consumption of computing resources to coordinate these transport events is significantly decreased through the improved prediction data provided by the data prediction and proactive request system. For at least these reasons, this disclosure may be integrated into the practical application of a data prediction and proactive request system that improves the technology used to coordinate the transport of items.

As yet another example, this disclosure may be integrated into the practical application of a data prediction and proactive request system that improves the usefulness of recorded event data, such as records of items being removed from and/or added to a location, into useful prediction data. This effective transformation of event data to actionable prediction data allows actions to be taken to improve efficiency and usability of a location.

Other example technical improvements are also provided by this disclosure such as the decreased use of fuel and other transportation resources that may be wasted when less accurate prediction data from previous technology is relied upon. If items are under-requested using previous data prediction technology, multiple trips may be needed to complete item transport for both the initial and supplemental item requests. By reducing or illuminating under-requests for items, the improved prediction data determined using the data prediction and proactive request system and the item requests provided by the system ensure that multiple transportation trips are not performed when a single trip would have been sufficient. This results in improved efficiency of the use of vehicles and energy for transportation as well as improvements to how transportation is utilized overall (e.g., by decreasing traffic, wear-and-tear on roads, etc.)

Furthermore, previous data prediction technology generally provides poor predictions for low-level, irregular events, such as events for removing of items that are not commonly removed (e.g., only once or zero times per day). For example, for a given item, if one unit is removed on Monday and Thursday and zero are removed the rest of the week, previous technology generally cannot provide a reliable day-by-day prediction for an upcoming time period. Therefore, transport of these items may be inefficient (e.g., by obtaining too many items) or insufficient (e.g., by obtaining too few). The data prediction and proactive response system of this disclosure uniquely overcomes this limitation of previous technology, for example, by using the improved triple moving average-based prediction process and/or the improved rounding process described below.

Prediction System

FIG. 1A is a diagram of an embodiment of a data prediction and proactive response system 100 (also referred to herein as the "data prediction system" or merely the "system" for conciseness). The data prediction system 100 includes a number of item request devices 102 (only one shown for clarity and conciseness), a prediction database 118, a data prediction subsystem 124, an event record database 138, and a transportation management subsystem 142. The data prediction system 100 provides improved prediction data 114 and improved recommendations 116 for proactively responding to or preparing for the likely future events indicated by the prediction data 114. The improved prediction data 114 and recommendation 116 may be used to send a more accurate and efficient request 140 for items to the transportation management subsystem 142, also resulting in improved efficiency of computing resources used to process the request by the transportation management subsystem 142.

Each item request device 102 may be a device, such as a computer, tablet, smart phone, or the like, that is used to display prediction data 114 and/or associated recommendations 116, such that a proactive response to likely future events can be implemented. Each item request device 102 may be associated with a location at which different events may occur and for which relevant prediction data 114 may be viewed, as described further below with respect to the example location 150 of illustrated in FIG. 1B. For instance, the item request device 102 may display a user interface 110 that displays prediction data 114 and/or recommendations 116 for the location of the item request device 102. Further details of the operation of an example item request device 102 are provided with respect to FIGS. 6 and 7 below.

The example item request device 102 includes a processor 104, memory 106, and network interface 108. The processor 104 of the item request device 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The processor 104 is also configured to present a user interface 110 (e.g., on a display of the item request device 102). The user interface 110 can present fields for indicating prediction data 114 and/or recommendations for proactively responding to the prediction data 114 (see FIGS. 6 and 7 and corresponding description below for further details). For example, a recommendation 116 may indicate a number of items to obtain to replace those anticipated to be removed by the prediction data 114. In some cases, the user interface 110 may receive input (e.g., input 726 of FIG. 7) indicating an action (e.g., obtaining a certain number of items) to implement based on the prediction data 114 and/or recommendation 116.

The memory 106 of the item request device 102 is operable to store any data, instructions, logic, rules, or code operable to execute the functions of the item request device 102. For example, the memory 106 may store event data 112 collected by the item request device 102 and prediction data 114 provided from the prediction database 118. The event data 112 generally includes information about previous and/or ongoing events occurring at the location of the item request device 102 (e.g., events 156, 160 at location 150 of FIG. 1B, described below). For example, the event data 112 may include a record of the status of items held at the location of the item request device 102. The prediction data 114 generally includes information associated with predictions performed by the data prediction subsystem 124 (see below). As shown in the prediction database 118 (described below), prediction data 114 may include a prediction data entry 114a,b for each of a plurality of identifiers 120a,b. The identifiers 120a,b may correspond to locations and/or items associated with the prediction data entries 114a,b. Further examples of events recorded in the event data 112 and predicted by the prediction data 114 are described with respect to FIG. 1B below. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may comprise read-only memory (ROM), random-access memory (RAM), ternary content-addressable memory (TCAM), dynamic random-access memory (DRAM), and static random-access memory (SRAM).

The network interface 108 of the item request device 102 is configured to enable wired and/or wireless communications. The network interface 108 is configured to communicate data between the item request device 102 and other network devices, systems, or domain(s), such as the prediction database 118 and event record database 138. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol as would be appreciated by one of ordinary skill in the art. The network interface 108 communicates event data 112 for storage in the event record database 138 and may provide a call 122 for prediction data 114 from the prediction database 118. For example, the call 122 may request a portion of the prediction data 114a,b from the prediction database 118 that is associated with the location of the item request device 102. The network interface 108 receives the requested prediction data 114.

The prediction database 118 is generally a database or datastore that stores (e.g., in a memory that is the same as or similar to memory 106 or 128) prediction data 114 determined by the data prediction subsystem 124. The prediction database 118 may store the prediction data 114 in any appropriate format, for example, in one or more tables or other organized records of data. The prediction data 114 may be stored as a number of prediction data entries 114a,b. Each prediction data entry 114a,b may be associated with one or more identifiers 120a,b, which may identify one or more of a location, item, group of items, location zone/subzone (see FIG. 3), or the like that are associated with the entry 114a,b. For example, a given entry 114a,b may indicate a number of items of a certain type that are anticipated to be removed from a given location during a future period of time. A prediction data entry 114a,b may be stored for each combination of item, location, and period of time, corresponding to identifier 120a,b. When a call 122 for prediction data 114 is received, the appropriate entries 114a,b are provided that correspond to the location of the item request device 102 sending the call 120.

The data prediction subsystem 124 generally includes one or more devices (e.g., a local or distributed server) configured to use event data 112 to determine prediction data 114. In some embodiments, the data prediction subsystem 124 uses prediction instructions 132 to determine prediction data 114. The prediction instructions 132 may include instructions for pre-processing event data 112 and/or any related information and using this to determine predictions data 114. The prediction instructions 132 may include logic, code, and/or rules for executing an artificial intelligence model that is trained to determine prediction data 114 using the event data 112.

In some embodiments, the prediction instructions 132 include code, logic, and/or rules for determining prediction data 114 based at least in part on a triple moving average, as described with respect to FIG. 2 below. For instance, the data prediction subsystem 124 may first determine a plurality of first moving averages that each correspond to events (e.g., changes in amount or availability of an item) over a previous period of time at a given location and for a given item. In some cases, prediction data 114 is determined using information from a previous period of time (e.g., two weeks) prior to a current day from which the prediction data 114 is being determined. Second moving averages are then determined by aggregating the first moving averages by product, and third moving averages are determined by aggregating the first moving averages by location. These three moving averages are combined using specially selected weights to arrive at prediction data 114. Further details of determining prediction data 114 using a triple moving average are provided with respect to FIGS. 2-4 below.

In some embodiments, the prediction data 114 is rounded using improved rounding instructions 134 in order to achieve readily interpretable integer values for non-integer prediction data 114 with less rounding error than was possible using previous technology, as described in greater detail below with respect to the example of FIG. 5. The prediction data 114 (e.g., whether rounded or not for a given application) is then provided to the prediction database 118 for access by the item request devices 102. Further details of rounding prediction data 114 using the improved rounding instructions 134 are provided with respect to FIGS. 2-4 below.

The data prediction subsystem 124 includes a processor 126, memory 128, and network interface 130. The processor 126 of the data prediction subsystem 124 includes one or more processors. The processor 126 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 126 may be a programmable logic device, a microcontroller, a microprocessor, or any suitable combination of the preceding. The processor 126 is communicatively coupled to and in signal communication with the memory 128 and network interface 130. The one or more processors are configured to process data and may be implemented in hardware and/or software. For example, the processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches instructions, such as prediction instructions 132, and rounding instructions 134, from memory 128 and executes them by directing the coordinated operations of the ALU, registers and other components.

Figure 4:
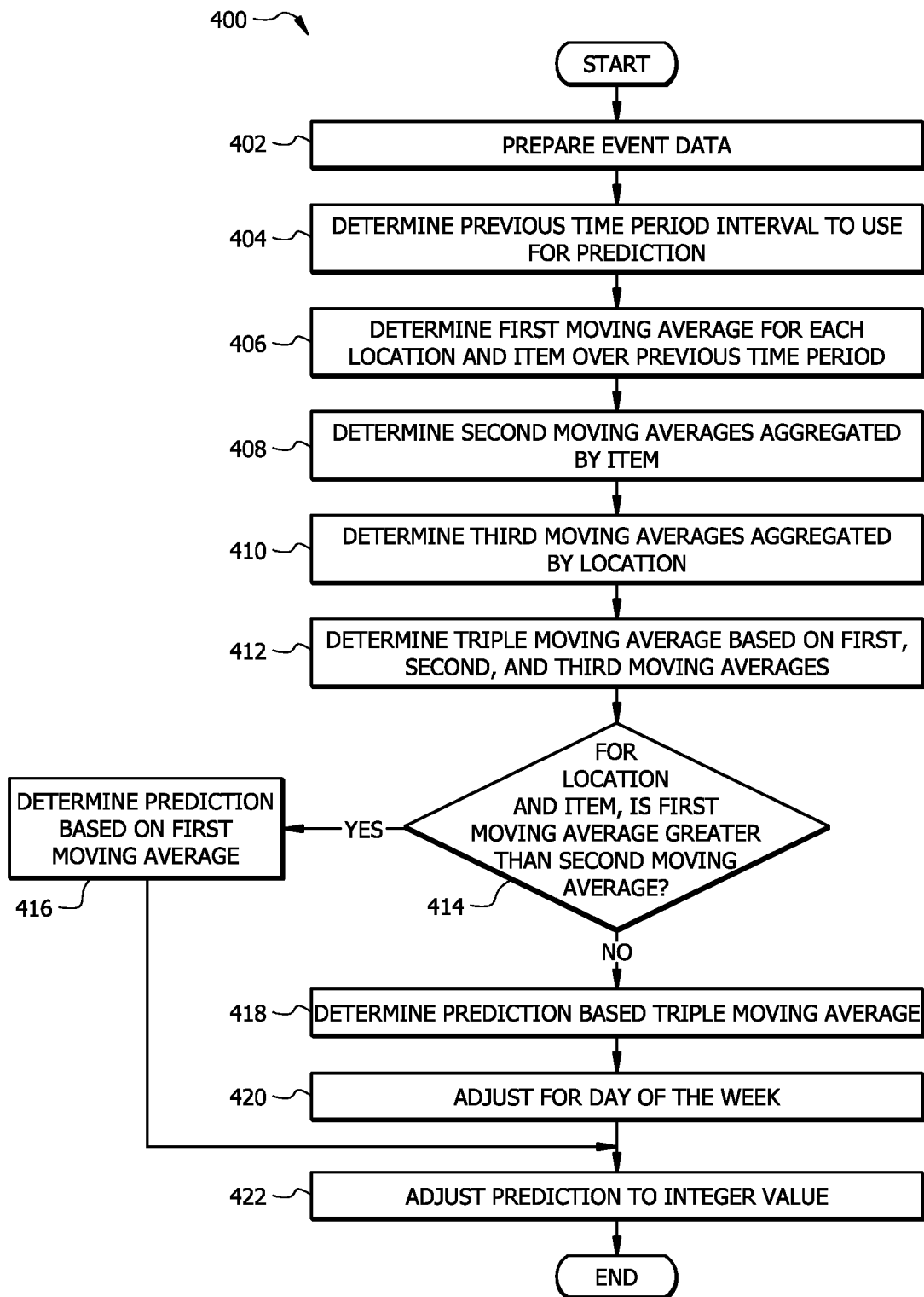
FIG. 4 is a flowchart of an example method of data prediction and proactive request performed by the system of FIG. 1.

The memory 128 of the data prediction subsystem 124 is operable to store any data, instructions, logic, rules, or code operable to execute the functions of the data prediction subsystem 124. The memory 128 may store the prediction instructions 132, rounding instructions 134, event data 112, and prediction data 114. The prediction instructions 132 include any logic, rules, and/or code for determining prediction data 114 using event data 112. In some cases, the prediction instructions 132 include logic, code, and/or rules for implementing an artificial intelligence model for performing at least a portion of the tasks used to determine prediction data 114. FIGS. 2 and 4 illustrate methods of implementing prediction instructions 132. Rounding instructions 134 include any logic, rules, and/or code for transforming non-integer prediction data 114 to integer values with as little error as possible. Rounding is generally useful because non-integer prediction data 114 may not have a readily interpretable meaning in the real world. For example, the removal of a non-integer, or fractional, amount of an item may not represent a realistic event when only integer values of the item can be removed. The memory 128 includes one or more disks, tape drives, or solid-state drives, and may be used as an over-flow data storage device, to store programs when such programs are selected for execution, and to store instructions and data that are read during program execution. The memory 128 may be volatile or non-volatile and may comprise read-only memory (ROM), random-access memory (RAM), ternary content-addressable memory (TCAM), dynamic random-access memory (DRAM), and static random-access memory (SRAM).

The network interface 130 of the data prediction subsystem 124 is configured to enable wired and/or wireless communications. The network interface 130 is configured to communicate data between the data prediction subsystem 124 and other network devices, such as the prediction database 118 and the event record database 138. The network interface 130 is an electronic circuit that is configured to enable communications between devices. For example, the network interface 130 may include one or more serial ports (e.g., USB ports or the like) and/or parallel ports (e.g., any type of multi-pin port) for facilitating this communication. As a further example, the network interface 130 may include a WIFI interface, a local area network (LAN) interface, a wide area network (WAN) interface, a modem, a switch, or a router. The processor 126 is configured to send and receive data using the network interface 130. The network interface 130 may be configured to use any suitable type of communication protocol as would be appreciated by one of ordinary skill in the art. The network interface 130 provides prediction data 114 to the prediction database 118 and a call 136 for event data 112 from the event record database 138. The network interface 130 receives event data 112 and may receive previously determined prediction data 114 that was stored in the prediction database 118.

The event record database 138 is generally a database or datastore that stores (e.g., in a memory that is the same as or similar to memory 106 or 128) event data 112 provided from the item request devices 102. The event record database 138 may store the event data 112 in any appropriate format, for example, in one or more tables or other organized records of data. The event data 112 may be stored as a number of entries 112a,b of event data. Each event data entry 112a,b may be associated with one or more identifiers 120a,b, as described above with respect to the prediction data entries 114a,b. An event data entry 112a,b may be available for each identifier 120a,b (e.g., for location and item) for which a prediction data entry 114a,b is determined by the data prediction subsystem 124. When a call 136 for event data 112 is received, the appropriate entries 112a,b (e.g., and in some cases all entries 112a,b) are provided that correspond to the locations and items for which prediction data 114 is to be determined.

The transportation management subsystem 142 is generally a computing device or collection of computing devices configured to receive requests 140 and help in coordinating activities in response to the request 142. For example, the transportation management subsystem 142 may determine a timing and route for transporting items indicated by a request 140. While one transportation management subsystem 142 is illustrated in the example of FIG. 1A, the system 100 could include any number of such subsystems. For example, each transportation management subsystem 142 may be associated with a different source of items that can be requested.

The transportation management subsystem 142 may include a processor 144, memory 1546, and network interface. The processor 126 of the transportation management subsystem 142 includes one or more processors. The processor 144 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 144 may be a programmable logic device, a microcontroller, a microprocessor, or any suitable combination of the preceding. The processor 144 is communicatively coupled to and in signal communication with the memory 146 and network interface 148. The one or more processors are configured to process data and may be implemented in hardware and/or software. For example, the processor 144 may be 8-bit, 16-bit, 32-bit, 64-bit or of any other suitable architecture. The processor 144 may include an arithmetic logic unit (ALU) for performing arithmetic and logic operations, processor registers that supply operands to the ALU and store the results of ALU operations, and a control unit that fetches instructions from memory 146 and executes them by directing the coordinated operations of the ALU, registers and other components.

The memory 146 of the transportation management subsystem 142 is operable to store any data, instructions, logic, rules, or code operable to execute the functions of the transportation management subsystem 142, for example, to coordinate transportation of items in response to a received request 140. The memory 146 includes one or more disks, tape drives, or solid-state drives, and may be used as an over-flow data storage device, to store programs when such programs are selected for execution, and to store instructions and data that are read during program execution. The memory 146 may be volatile or non-volatile and may comprise read-only memory (ROM), random-access memory (RAM), ternary content-addressable memory (TCAM), dynamic random-access memory (DRAM), and static random-access memory (SRAM).

The network interface 148 of the transportation management subsystem 142 is configured to enable wired and/or wireless communications. The network interface 148 is configured to communicate data between the transportation management subsystem 142 and other network devices, such as the item request device 102. The network interface 148 is an electronic circuit that is configured to enable communications between devices. For example, the network interface 148 may include one or more serial ports (e.g., USB ports or the like) and/or parallel ports (e.g., any type of multi-pin port) for facilitating this communication. As a further example, the network interface 148 may include a WIFI interface, a local area network (LAN) interface, a wide area network (WAN) interface, a modem, a switch, or a router. The processor 144 is configured to send and receive data using the network interface 148. The network interface 148 may be configured to use any suitable type of communication protocol as would be appreciated by one of ordinary skill in the art. The network interface 148 receives request 140.

Figure 1B:
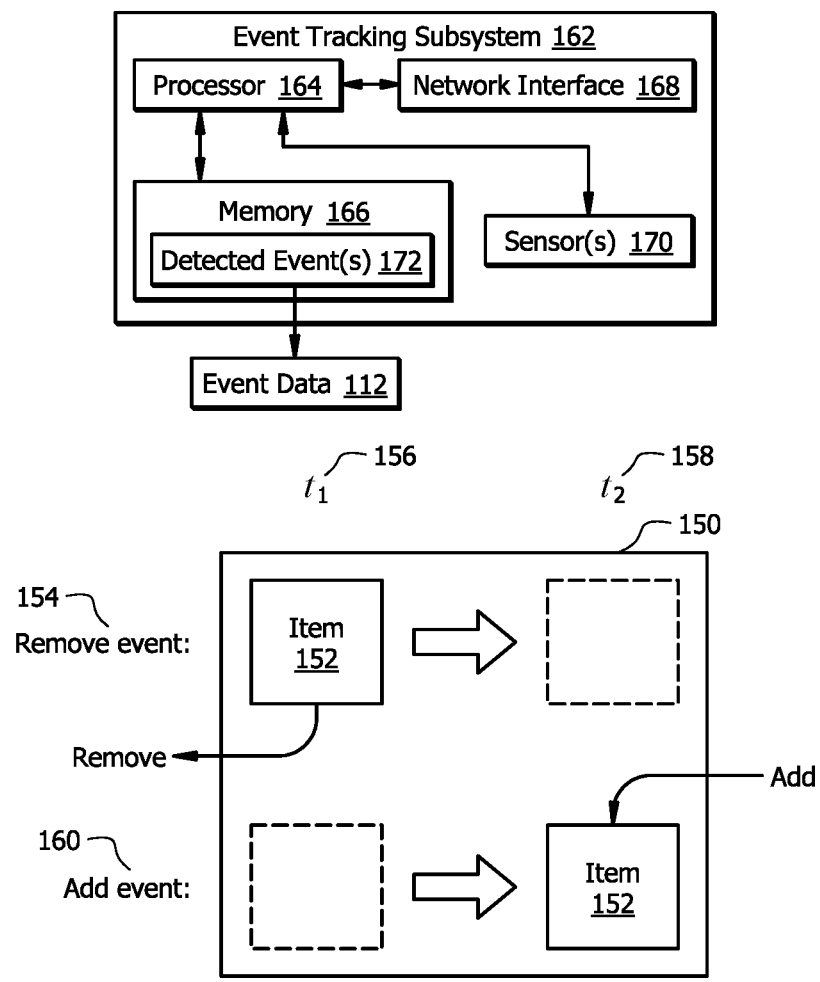
FIG. 1B is a diagram illustrating example events occurring at a location associated with an item request device of the data prediction and proactive request system of FIG. 1.

In an example operation of the system 100, item request device 102 is associated with the location 150 shown in FIG. 1B. Location 150 may be any place-of-interest where prediction future events can provide technical benefits, as described above. The item request device 102 may record event data 112 corresponding to different events 154, 160 occurring at the location 150, such as add events 154 and remove events 160. For instance, event data 112 may include a record of remove events 154 corresponding to when an item 152 originally at location 150 at time 156 is removed from the location 150, such that it is no longer at the location 150 at the subsequent time 158. Meanwhile, add events 160 correspond to the item 152 being added to the location 150. For example, an add event 160 may correspond to the item 152 not being present at time 156 and being added at least by a subsequent time 158.

In some embodiments, an event tracking subsystem 162 may be used to determine detected events 172, which include the remove events 154 and/or add events 160 that are included in the event data 112. For example, an event tracking subsystem 162 may a device that includes one or more sensors 170 to detect that an item 152 has been added or removed from the location 150. For instance, a sensor 170 may be a bar code reader, a camera (e.g., for imaging a QR code or other code), or the like. As an example, when the item 152 is removed from the location 150 during a remove event 154, the item 152 may be scanned with the sensor 170. A detected event 172 is determined for the item 152. This detected event 172 corresponds to a remove event 154 that is included in the event data 112. In some embodiments, all or a portion of the operations of the event tracking subsystem 162 may be performed by the item request device 102, described above.

In addition to the sensor 170, the event tracking subsystem 162 may include a processor 164, memory 166, and network interface 168. The processor 164 of the event tracking subsystem 162 includes one or more processors. The processor 164 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 164 may be a programmable logic device, a microcontroller, a microprocessor, or any suitable combination of the preceding. The processor 164 is communicatively coupled to and in signal communication with the memory 166 and network interface 168. The one or more processors are configured to process data and may be implemented in hardware and/or software. For example, the processor 164 may be 8-bit, 16-bit, 32-bit, 64-bit or of any other suitable architecture. The processor 164 may include an arithmetic logic unit (ALU) for performing arithmetic and logic operations, processor registers that supply operands to the ALU and store the results of ALU operations, and a control unit that fetches instructions from memory 166 and executes them by directing the coordinated operations of the ALU, registers and other components.

The memory 166 of the event tracking subsystem 162 is operable to store any data, instructions, logic, rules, or code operable to execute the functions of the event tracking subsystem 162. The memory 166 may store detected events 172. The memory 166 includes one or more disks, tape drives, or solid-state drives, and may be used as an over-flow data storage device, to store programs when such programs are selected for execution, and to store instructions and data that are read during program execution. The memory 166 may be volatile or non-volatile and may comprise read-only memory (ROM), random-access memory (RAM), ternary content-addressable memory (TCAM), dynamic random-access memory (DRAM), and static random-access memory (SRAM).

The network interface 168 of the event tracking subsystem 162 is configured to enable wired and/or wireless communications. The network interface 168 is configured to communicate data between the event tracking subsystem 162 and other network devices, such as the item request device 102 and/or the event record database 138 to store detected events 172 as part of event data 112. The network interface 168 is an electronic circuit that is configured to enable communications between devices. For example, the network interface 168 may include one or more serial ports (e.g., USB ports or the like) and/or parallel ports (e.g., any type of multi-pin port) for facilitating this communication. As a further example, the network interface 168 may include a WIFI interface, a local area network (LAN) interface, a wide area network (WAN) interface, a modem, a switch, or a router. The processor 164 is configured to send and receive data using the network interface 168. The network interface 168 may be configured to use any suitable type of communication protocol as would be appreciated by one of ordinary skill in the art. The network interface 130 provides detected events 172 for inclusion in event data 112.

The event data 112 for location 150 (and any number of other similar locations) is accessible by the data prediction subsystem 124 (e.g., via the event record database 138). The data prediction subsystem 124 uses the prediction instructions 132 to determine prediction data 114 and optionally the rounding instructions 134 to round the prediction data 114 for subsequent use by the item request device 102. Further details of determining the prediction data 114 and rounding the prediction data 114 are provided below with respect to the examples of FIGS. 2-5.

When determining whether to obtain an item 152 for a future period of time, the item request device 102 may send a call 122 to request prediction data 114 for the location 150 of the item request device 102. The received prediction data 114 may include a number of items 152 that are predicted to be removed via a remove event 154 over a time period (e.g., between time 156 and time 158). The item request device 102 may determine a recommendation 116 of how many of the item 152 to obtain for the future period of time. Through the determination of improved prediction data 114, system 100 is integrated into the practical applications of (1) improving the efficiency of network bandwidth usage to request items 152, (2) decreasing consumption of memory and processing resources employed to coordinate and complete transportation of the item 152, and (3) decreasing the usage of physical infrastructure (e.g., fuel, vehicles, etc.) that is needed to obtain the item 152.

Data Prediction Using a Triple Moving Average

As described above, in some cases, prediction data 114 is determined using a triple moving average. This approach facilitates the determination of more reliable and accurate predication data 114 than was previously possible by determining predictions as a weighted combination of three moving averages. In an example where a prediction value is determined for each item at a given location (e.g., a location 150), a set or array of first moving averages may be determined for each item at the location based on the number of removal events occurring over a recent period of time (e.g., two weeks). This disclosure recognizes that the first moving average alone may not provide a sufficiently reliable prediction of future item removal events. For instance, for an item that is relatively infrequently removed, there may not be enough available information to determine an accurate first moving average. To overcome this challenge, two additional moving averages are determined that provide additional information for accurately predicting future events. For example, a second moving average is determined that is aggregated by location and adjusted using a specially determined coefficient that is based at least using an item aggregation (e.g., item group or category 236 of FIG. 2). Meanwhile, a third moving average is determined that is aggregated by item and adjusted using a specially determined coefficient that is based at least in part on a location aggregation (e.g., zone 226 of FIG. 2). These three moving averages are used in combination (e.g., in a weighted combination) to determine improved prediction data 114.

An example formula for calculating a prediction to include in the prediction data 114 is:

$$\text{Prediction} = c1 \times loc\_item\_avg + c2 \times loc\_agg\_item\_avg \times loc\_loc\_agg\_item\_agg\_coeff + c3 \times loc\_item\_agg\_avg \times item\_item\_agg\_loc\_agg\_coeff$$

Figure 2:
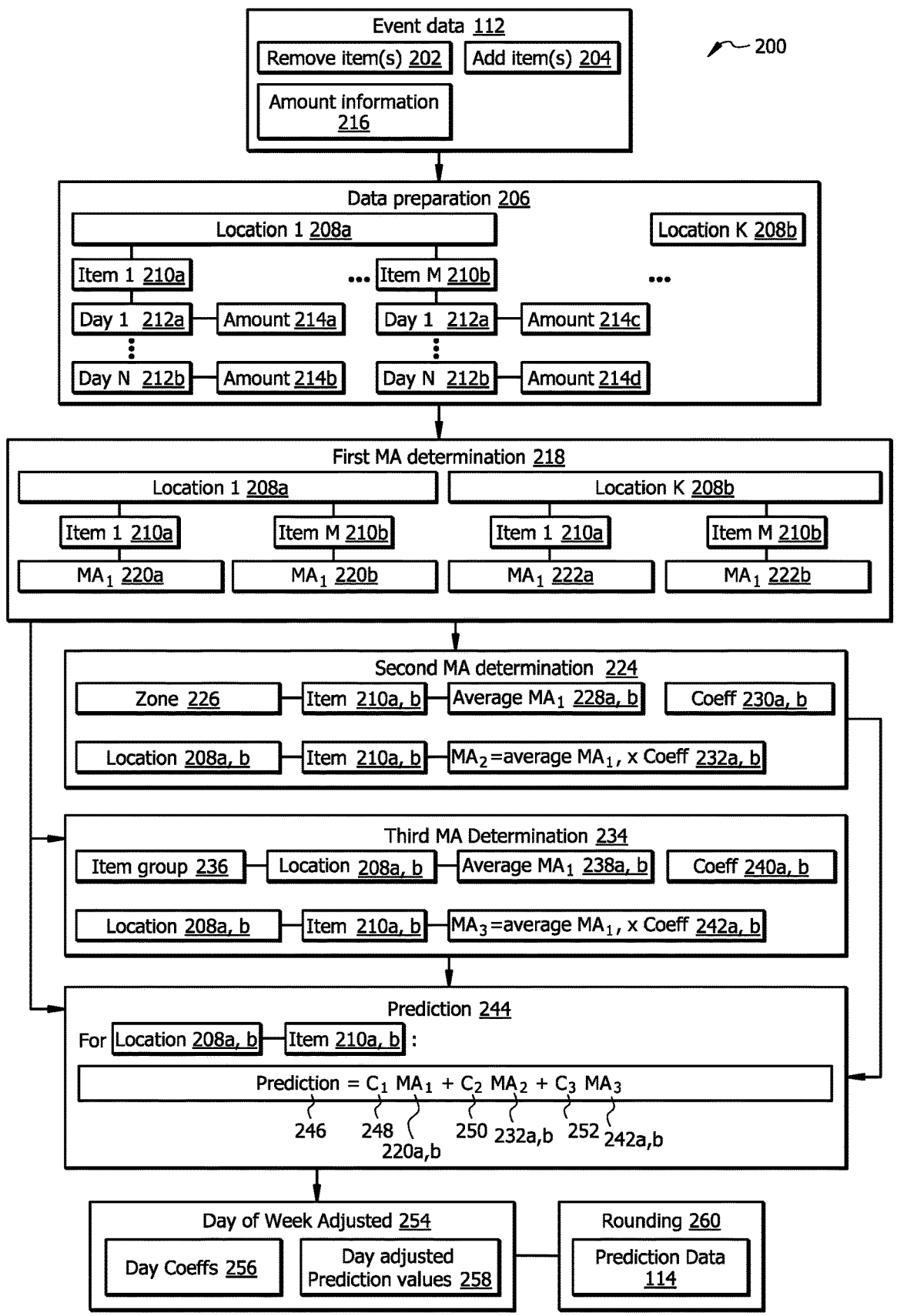
FIG. 2 is a flow diagram illustrating an example data prediction process employing a triple moving average.

In this equation, c1, c2, and c3 are weighting coefficients (e.g., coefficient 248, 250, 252 of FIG. 2). As described further below, the values of c1, c2, and c3 may be determined, for example, using an artificial intelligence model, to combine the moving averages in a way that further improves the accuracy and reliability of the prediction data 114. The term loc_item_avg refers to the set of first moving averages at the location where a predictions is being performed and for a specific item of a given prediction. The term loc-agg_item_avg refers to the set of first moving averages for a specific item aggregated by location. The term loc_loc-agg_item-agg_coeff refers to a set of coefficients that adapt or adjust the moving average aggregated by location (loc-agg_item_avg) to a specific location using an item aggregation (e.g., item group or category 236 of FIG. 2, described below) as a reference. The product of loc-agg_item_avg× loc_loc-agg_item-agg_coeff is referred to as the second moving average (e.g., a moving average 232*a,b* of FIG. 2) for a location and item. The loc_loc-agg_item-agg_coeff allows information aggregated by location (e.g., by a location dimension) to be related to a specific location using an aggregate of items as the basis for comparison. By using loc_loc-agg_item-agg_coeff, the information aggregated according to a location dimension (loc-agg_item_avg) can be related back to a particular location using the item aggregate as a basis, thereby providing more useful prediction information for improving the accuracy of the prediction for a given location.

The term loc_item-agg_avg refers to the set of first moving averages for a specific location aggregated by item. The term item_item-agg_loc-agg_coeff refers to a set of coefficients that adapt the first moving average aggregated by item (loc_item-agg_avg) to a specific item using a location aggregation (e.g., a zone 226 of FIG. 2) as a reference. The product of loc_item-agg_avg×item_item-agg_loc-agg_coeff is referred to as the third moving average (e.g., a moving average 242a,b of FIG. 2) for a location and item. The item_item-agg_loc-agg_coeff allows information aggregated by item (e.g., by an item dimension) to be related to a specific item using an aggregate of locations as the basis for comparison. Using the item_item-agg_loc-agg_coeff allows the information aggregated according to an item dimension (loc_item-agg_avg) to be related back to a particular item using a location aggregate as a basis, thereby providing more information for generating improved predictions.

FIG. 2 illustrates an example process 200 for determining prediction data 114 from event data 112 by the data prediction subsystem 124. Process 200 may be implemented using the prediction instructions 132 of FIG. 1. Process 200 includes the step-by-step manipulation of computer data structures represented by the arrays of linked information shown for the steps of first moving average determination 218, second moving average determination 224, third moving average determination 234, and prediction 244. Process 200 may begin with data preparation 206. During data preparation, event data 112 is stored in an appropriately aggregated and formatted form that facilitates its use for prediction 238.

A detailed description of process 200 is provided below. However, in brief, the process 200 may flow from data preparation 206, where event data 112 is transformed into a more usable initial data structure for reliably generating improved prediction data 114 by determining, through a progressive series of data manipulations, arrays of moving averages 220a,b, 222a,b, 232a,b, 242a,b that are then appropriately combined in a triple moving average to determine prediction values 246. The prediction values 246 may then be adjusted for the day of the week and rounded. During example process 200, a first moving average 220a,b, 222a,b is determined for each item 210a,b at each location 208a,b over a previous period of time. This disclosure recognizes that if the first moving averages 220a,b, 222a,b were used alone for prediction, the results may be inconsistent and/or unreliable. As such, a triple moving average is used instead that combines the first moving averages 220a,b, 222a,b with second and third moving averages 232a,b, 242a,b. The second moving averages 232a,b aggregate the first moving averages 220a,b, 222a,b by item 210a,b in different location zones 226. The third moving averages 242a,b aggregate the first moving averages 220a,b, 222a,b by location 208a,b and item category or group 236. If a prediction is needed for a given item 210a,b and location 208a,b, the second and third moving averages 232a,b, 242a,b provide useful information about recent events at similar locations (e.g., in the same zone 226 as the location 208a,b being predicted) and similar items (e.g., in the same item group 236 as the item 210a,b being predicted) without potential fluctuations that might be observed in the first moving average 220a,b, 222a,b for the item 210a,b and location 208a,b alone. As such, the new approach of process 200 may provide more reliable prediction data 114 that is less susceptible to fluctuations in recent changes in activity at a single location 208a,b.

As received, event data 112 may include a record of removed items 202 and added items 204 at each location for which the data prediction subsystem 124 provides prediction data 114. Removed items 202 may correspond to records of remove events 156 of FIG. 1B, while added items 204 may correspond to records of added item events 160 of FIG. 1B (see above). During data preparation 206, the event data 112 is aggregated by location 208a,b, item 210a,b, and day 212a,b. For example, for each location 208a,b, item 210a,b, and day 212a,b combination there is an amount 214a-d. The amount 214a-d may be the number of the items 210a,b removed at location 208a,b on day 212a,b.

Data preparation 206 may be performed by aggregating individual events 156, 160 to determine amounts 214a-d of items 210a,b that are removed for locations 208a,b on different days 212a,b. In the example of FIG. 2, the event data 112 is prepared for K locations 208a,b, M items 210a,b and N days 212a,b. Amount information 216 may be included in the event data 112 and describe which items 210a,b are carried at each location 208. Amount information 216 for the locations 208a,b may be used to determine if items 210a,b are carried that may not have been removed, such that days 212a,b with an amount 214a-d of zero can be determined and appropriately included during data preparation 206. Without this adjustment, days 212a,b with amounts 214a-d of zero for an item 210a,b may be missed.

During data preparation 206, adjustments may be made as necessary to account for possible changes in item identifiers used at different locations 208a,b over time to ensure the correct items 210a,b are included during data preparation 206. Moreover, amounts 214a-d may be adjusted to correspond to available item quantities. For example, if a given item 210a,b is removed individually but only available in groups (e.g., in a set of six), the amount 214a-d may be adjusted based on the available item quantity. For instance, if three units of an item 210a,b that is received in a set of six are removed on a given day 212a,b for location 208a,b, then the amount 214a-d for that location 208a,b, item 210a,b, and day 212a,b combination may be 0.5 (i.e. three divided by six). During data preparation 206, outliers may also be identified and removed or adjusted for to determine amounts 214a-d. For instance, if much larger quantities of an item 210a,b are suddenly removed on a given day 212a,b than have recently been observed, the amount 214a-d may be adjusted to a lower value. This outlier adjustment helps prevent this anomalous activity from impacting the prediction data 114 more than would be appropriate when this kind of item removal activity is not expected to continue going forward.

After data preparation 206, the data prediction subsystem 124 performs a first moving average determination 218. At this stage, an array is determined of first moving averages 220a,b, 222a,b for each location 208a,b and item 210a,b. Items 210a,b may vary by location 208a,b, such that one location 208a,b may have a different number of first moving averages 220a,b than the number of first moving averages 222a,b at another location 208b. Each first moving average 220a,b, 222a,b is a weighted average over a previous period of time of the amounts 214a-d determined during data preparation 206. For example, the first moving averages

220a,b, 222a,b may be a weighted average of amounts 214a-d removed of items 210a,b over a previous period of time corresponding to at least a subset of the days 212a,b for which amounts 214a-d are available. As an example, a first moving average 220a,b, 222a,b (MA$_1$) for a given item 210a,b over a 14 day time period from the current day may be determined as:

$$MA_1 = C1 \times \text{Amount } Lag(1) + C2 \times \text{Amount } Lag(2) +$$
$$C3 \times \text{Amount } Lag(3) + C4 \times \text{Amount } Lag(4) +$$
$$C5 \times \text{Amount } Lag(5) + C6 \times \text{Amount } Lag(6) +$$
$$C7 \times \text{Amount } Lag(7) + C8 \times \text{Amount } Lag(8) +$$
$$C9 \times \text{Amount } Lag(9) + C10 \times \text{Amount } Lag(10) +$$
$$C11 \times \text{Amount } Lag(11) + C12 \times \text{Amount } Lag(12) +$$
$$C13 \times \text{Amount } Lag(13) + C14 \times \text{Amount } Lag(14)$$

where C1-C14 are day-specific weighting coefficients, Amount Lag(i) is the amount 214a-d for each day 210a,b (i), and i is the number of days (14 in this example) counting backwards from the current day. For instance, Amount Lag(1) may correspond to amount 214a one day ago, while Amount Lag(2) may correspond to amount 214b two days ago. The weighting coefficients C1-C14 may be scaled to give more weight to more recent days 212a,b (e.g., such that C1>C2>C4, etc.). As a non-limiting example, values of the weighting coefficients may be C1=0.12, C2=0.09, C3=0.09, C4=C5=0.08, C6=C7=0.07, C8=C9=0.05, and C10=C11=C12=C13=C14=0.06.

In the example above, the first moving averages 220a,b, 222a,b are determined over a previous time period of two weeks (i.e., 14 days). Generally any appropriate time period may be used. While in this example embodiment two weeks is the default time period for determining first moving averages 220a,b, 222a,b, an adjusted time period may be used to further improve prediction in some situations. For example, as long as a first moving average 220a,b, 222a,b is greater than a threshold value (e.g., of 0.4), only one previous week (e.g., days one to seven) may be used if the preceding week (e.g., days eight to fourteen) all had amounts 214a-d of zero. By using this truncated period of time, prediction can be improved for items 210a,b with emerging activity.

Figure 3:
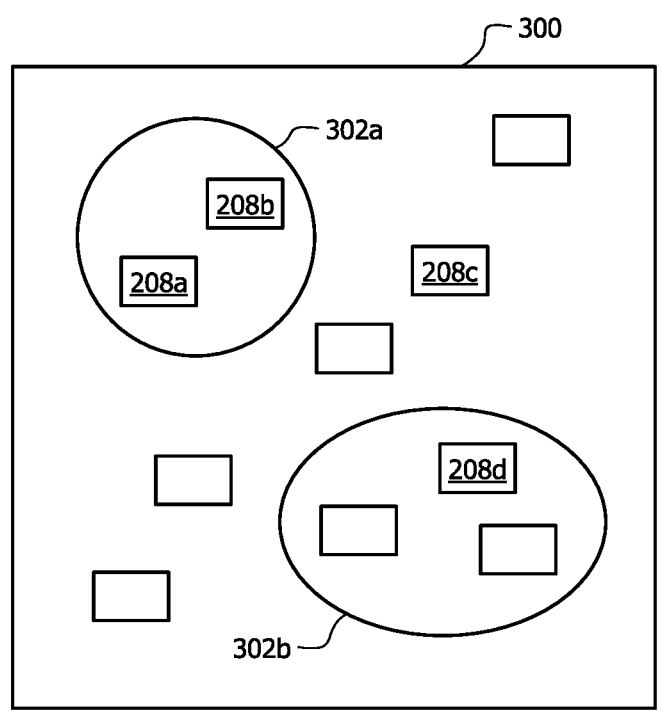
FIG. 3 is diagram illustrating an example physical zone of locations for which the data prediction process of FIG. 2 may be performed.

Following the first moving average determination 218, the data prediction subsystem 124 performs a second moving average determination 224 and third moving average determination 234. For the second moving average determination 224, the data prediction subsystem 124 aggregates the first moving averages by item 210a,b for various zones 226 in which locations 208a,b may be grouped. Zones 226 are generally groupings of locations 208a,b, for example, by geographical region or some other shared characteristics of locations 208a,b within a given zone 226. FIG. 3 illustrates an example zone 300 that includes a number of locations 208a-d (for conciseness not all locations are labeled in FIG. 3). Locations 208a-d may also be associated by sub-zones 302a,b, for example, through being located near each other within the larger zone 300. In the example of FIG. 3, locations 208a and 208b are in sub-zone 302a. Location 208c is not in a sub-zone, and location 208d is in sub-zone 302b.

Returning to second moving average determination 224 of FIG. 2, for each zone 226 and item 210a,b, an average 228a,b of the first moving averages 220a,b, 222a,b is determined. For example, the first moving averages 220a,b, 222a,b for the zone 226 and item 210a,b may be summed and divided by the number of first moving averages 220a,b, 222a,b in the sum to determine average 228a,b. A coefficient 230a,b is also determined for relating average 228a,b for the zone 226 to a location 208a,b where the prediction is being performed. The coefficient 230a,b may be the loc_loc-agg_item-agg_coeff described above. For example, the coefficient 230a,b may be determined as the sum of the first moving averages 220a,b, 222a,b for all items 210a,b in a group of similar items (e.g., in an item group 236 described below that includes the item 210a,b) divided by the sum of the average moving averages 220a,b, 222a,b for all items 210a,b in the item group for the location 208a,b. The second moving average 232a,b for each location 208a,b and item 210a,b is determined as the average 228a,b multiplied by the corresponding coefficient 230a,b.

For the third moving average determination 230, the data prediction subsystem 124 aggregates the first moving averages 220a,b, 222a,b by location 208a,b. This aggregation may be performed using item groups 226, which include sets of related items 210a,b. For example, items 210a,b corresponding to different types of beverages may be grouped in a beverage item group 236. For each item group 236 and location 208a,b, an average 238a,b of the first moving averages 220a,b, 222a,b is determined. For example, the first moving averages 220a,b, 222a,b for the item group 236 and location 208a,b may be summed and divided by the number of moving averages 220a,b, 222a,b in the sum to determine average 238a,b. A coefficient 240a,b is also determined for relating average 238a,b to a particular item 210a,b for which a prediction is being performed. The coefficient 240a,b may be the item_item-agg_loc-agg_coeff described above. For example, the coefficient 240a,b may be determined as the sum of the first moving averages 220a,b, 222a,b in the zone 226 divided by the sum of the average first moving averages 220a,b, 222a,b for the same item group 236 as the item 210a,b being predicted. The third moving average 242a,b for each location 208a,b and item 210a,b is determined as the average 238a,b multiplied by the corresponding coefficient 240a,b.

The moving averages 220a,b, 222a,b, 232a,b, 242a,b from the first moving average determination 218, second moving average determination 224, and third moving average determination 234 are used to perform prediction 244. A prediction value 246 is determined as a triple moving average, which is a weighted combination of moving averages 220a,b, 222a,b, 232a,b, 242a,b. For instance, as illustrated in FIG. 2, for a given location 208a,b and item 210a,b, the prediction value 246 may be the product of a first weighting coefficient 248 by the first moving average 220a, b, 222a,b plus a product of a second weighting coefficient 250 by the second moving average 232a,b plus a product of a third weighting coefficient 252 by the third moving average 242a,b. The weighting coefficients 248, 250, 252 may be determined using an artificial intelligence model included in the prediction instructions 132 to improve the stability of the prediction value 246. For example, the first moving average 220a,b, 222a,b may include fluctuations from changes in events (e.g., add and/or remove events 156, 160 of FIG. 1B) at the location 208a,b for which a given prediction value 246 is determined. Meanwhile, the second and third moving averages 232a,b, 242a,b reflect information aggregated by item 210a,b and location 208a,b, such that they fluctuate less over time. In some cases (see step 414 of FIG. 4, described below), a location 208a,b may outperform the average of the location's zone 226. In such cases, the first moving average 220a,b, 222a,b for the location 208a,b is greater than the corresponding second moving average 232a,b, and the first moving average 220a,b, 222a,b may be used in place of the triple moving average-based prediction value 246, described above. This helps ensure that a prediction value 246 for the location 208a,b and item 210a,b is not incorrectly decreased when the location 208a,b is outperforming other locations 208a,b in the same zone 226.

The prediction value 246 for a location 208a,b and item 210a,b may be adjusted to reflect expected fluctuations for a given location 208a,b based on the day of the week, thereby further improving the prediction data 114. Day-of-the-week (DOW) coefficients 256 may be determined for each location 208a,b and used to determine a day-adjusted prediction values 258 from the prediction values 246. The DOW coefficients 256 may be determined as an average or weighted sum of a store coefficient ($C_{store}$) and an item coefficient ($C_{item}$) Depending on the availability of information, different calculations may be performed to determine these DOW coefficients 256, as shown in TABLE 1 below. If the requisite information is available for determining the DOW coefficient 256, Option 1 is used before Option 2, and Option 2 is used before Option 3. If the information for Options 1-3 is not available, Option 4 is used to determine the DOW coefficients 256.

prediction. For example, if the first moving average 220a,b, 222a,b is greater than a threshold value (e.g., of 0.4) and if the amounts 214a-d during a first portion of the default time period (e.g., if amount 214a-d is zero for days eight to fourteen of the default two week period), a truncated one week time period of the event data 112 may be used. In other words, the data prediction subsystem 124 may determine that the amount of the item 210a,b removed on each day 212a,b during a first portion of a default time interval (e.g., days eighth through fourteen of a default two-week period) is zero and, in response, determine a truncated portion of the default time interval to use as the adjusted time period (e.g., that excludes the first portion of the default time period). By using this adjusted period of time, prediction can be improved for items 210a,b with emerging activity (e.g., where the item 210a,b may not have been known or fully available in the preceding week).

At step 406, the first moving averages 220a,b, 222a,b are determined over the previous time period determined at step 404. Determination of the first moving averages 220a,b, 222a,b is described in detail above with respect to FIG. 2. In brief, each first moving average 220a,b, 222a,b is determined as a weighted combination, or average, of the amount 214a-d of the item 210a,b removed from a corresponding location 208a,b each day 212a,b during the time interval determined at step 404. The first moving averages 220a,b,

TABLE 1 example operations for determining DOW coefficients 256

| | Option 1 | Option 2 | Option 3 | Option 4 |
|---|---|---|---|---|
| $C_{store}$ | sum of amounts by DOW, location, and item category divided by sum of amounts at the location for the matching item category | sum of amounts by DOW and location divided by sum of amounts at the location | sum of amounts by DOW and item category divided by sum of amount in the item category | sum of amounts by DOW at the location divided by total sum of amounts |
| $C_{item}$ | sum of amounts by DOW, item, and zone, divided by sum of amounts for the items in the location's zone | sum of amounts by DOW and item, divided by sum of amounts for the item | sum of amounts by DOW and zone divided by sum of amounts in the zone | |

The data prediction subsystem 124 may then perform rounding 260 to determine prediction data 114 based on the day-adjusted prediction values 258. Further description of an example process for rounding 260 is provided below with respect to FIG. 5.

FIG. 4 illustrates an example method 400 of data prediction. The method 400 may be implemented using the processor 126, memory 128, and network interface 130 of the data prediction subsystem 124 of FIG. 1. Method 400 may begin at step 402 where event data 112 is prepared by the data prediction subsystem 124. For example, the event data may be prepared by appropriately aggregating and/or adjusting the event data 112 as described with respect to data preparation 206 of FIG. 2 above.

At step 404, the data prediction subsystem 124 determines a previous time period or interval of the event data 112 to use for data prediction. For example, the data prediction subsystem 124 may normally use a default time period corresponding to previous days 212a,b over which event data 112 is available. However, if certain conditions are met, a modified time period of event data 112 may be used for data 222a,b may be weighted to provide increased weights to the amount 214a-d of the item 210a,b removed on more recent days in time period (see description of first moving average determination 218 of FIG. 2 above).

At step 408, second moving averages 232a,b are determined, as described with respect to FIG. 2 above. In brief, the first moving averages 220a,b, 222a,b are aggregated by item 210a,b to determine the second moving averages 232a,b. For instance, for each location 208a,b, an average 228a,b may be determined of the first moving averages 220a,b, 222a,b for a zone 226 with which the location 208a,b is associated (see also FIG. 3). A coefficient 230a,b may be determined for the location 208a,b. As an example, the coefficient 230a,b may be the sum of the first moving averages 220a,b, 222a,b for items 210a,b in an item category or group 236 associated with the item 210a,b divided by an average of the first moving averages 220a,b, 222a,b for the item group 236 in the zone 226 with which the location 208a,b is associated. The second moving average is a product of the average 228a,b and the coefficient 230a,b.

At step 410, third moving averages 242a,b are determined, as described with respect to FIG. 2 above. In brief, the third moving averages 242a,b are determined by aggregating the first moving averages 220a,b, 222a,b by location 208a,b. For example, an average 238a,b may be determined of the first moving averages 220a,b, 222a,b for an item group 236 associated with the item 210a,b being predicted. A coefficient 240a,b may be determined for the item group 236. As an example, the coefficient 240a,b may be determined based on a sum of the first moving averages 220a,b, 222a,b for a zone 226 with which the location 208a,b being predicted is associated divided by an average of the first moving averages 220a,b, 222a,b for the item group 236 in the zone 226. The third moving average 242a,b is determined as the product of the average 238a,b and the coefficient 240a,b.

At step 412, prediction values 246 are determined based on a triple moving average that combines the first moving average 220a,b, 222a,b from step 406, the second moving average 232a,b from step 408, and the third moving average 242a,b from step 410, as described above with respect to prediction 244 of FIG. 2.

At step 414, the data prediction subsystem 124 may determine whether, for a given location 208a,b and item 210a,b, the first moving average 220a,b, 222a,b from step 406 is greater than the second moving average 232a,b from step 408. If this is the case, the data prediction system 124 proceeds to step 416 and uses the first moving average 220a,b, 222a,b alone for data prediction. For example, in such cases, the first coefficient 248 is set to one and the other coefficients 250, 252 are set to zero. Otherwise, if the conditions of step 414 are not satisfied, the data prediction subsystem 124 proceeds to step 418 and determines the prediction values 246 based on a weighted combination (e.g., using predefined, non-zero values for each of the coefficients 248, 250, 252 of FIG. 2) of the first, second, and third moving averages 220a,b, 222a,b, 232a,b, 242a,b.

At step 420, the data prediction subsystem 124 may adjust the prediction values 246 (from step 416 or 418) based on the day of the week, as described, for example, with respect to the day-of-the-week adjustment 254 of FIG. 2 above. For example, for each location 208a,b being predicted, day-of-the-week coefficients 256 may be calculated (see TABLE 1 above) and used to determine day-adjusted prediction values 258 that includes a value adjusted for each day of the prediction time period. The resulting day-adjusted prediction values 258 may then be rounded at step 422 to determine the prediction data 114. In some cases the unique rounding process of FIG. 5 (see below) may be employed to further improve the accuracy and reliability of the resulting prediction data 114.

Rounding with Cumulative Error Redistribution

As described above, the rounding instructions 134 of the data prediction subsystem 124 may facilitate improved performance of the system 100, such that the prediction data 114 more accurately represents likely future events. This improved rounding can be achieved using an approach that redistributes cumulative error throughout the days for which the prediction data 114 is determined. Rounding with cumulative error redistribution results in decreased overall rounding error compared to conventional rounding approaches, in which a prediction value for each day over a prediction period is merely rounded to the nearest integer value. Prediction values 116 are may be rounded for each day because real items generally cannot be handled or ordered on a non-integer basis in the real world (e.g., a typical item cannot be broken into a fractional amount). Conventional rounding can introduce a large amount of error because error grows with each rounding operation. The new process of rounding with cumulative error redistribution prevents this problematic rounding error by distributing rounding error throughout the days of the future period of time of a prediction. This decrease in rounding error provides advantages to both the accuracy and reliability of the final rounded prediction data 116 by ensuring that the prediction data 116 reflects meaningful integer-value units of predicted items removed for each day, while not undermining the advantages gained through the improved prediction approaches described above. This improved rounding process also helps ensure that the final prediction data 116 is most useful for improving the efficiency of communicating item requests 140, improving the efficiency of resources used to coordinate the transportation of requested items (e.g., by the transport management subsystem 142), and improving the efficiency with which other physical resources are used to complete item transport, as described in greater detail above.

FIG. 5 shows a table 500 that illustrates the improved results of rounding with cumulative error redistribution. Table 500 includes columns for the days 502 over the period of time of the prediction, prediction values 504 for each day 502, cumulative error (CE) values 506 for each day 502, rounded prediction values 508 for each day 502, and rounded values 510 that are obtained for each day 502 using a conventional rounding approach where the prediction value 504 for each day 502 is simply rounded to the nearest integer value. The prediction values 504 may correspond to the day-adjusted prediction values 258 described above with respect to FIGS. 2 and 4. The cumulative error values 506 represent error accumulated over the days 502 through the rounding process. Cumulative error 506 is determined for each day 502 and used to improve the accuracy of rounding over the prediction period, as described further below. The rounded prediction values 508 may be included in the prediction data 114 of FIG. 1.

To provide more detail of rounding with cumulative error redistribution, pseudocode demonstrating example rounding instructions 134 to implement rounding with cumulative error redistribution is shown below:

```
CE_0 = 0
rnd_predict _1 = round(predict_1)
for i = 1 to 14
    rnd_predict_i = round(predict_i + CE_i - 1)
    CE_i=sum(predict_1:predict_i)-sum(rnd_predict_1: rnd_predict_i)
end
```

As demonstrated by this pseudocode, a rounded prediction value 508 (rnd_predict_i) is determined for each of i days corresponding to the prediction period (14 days in this example). The rounded prediction value 508 (rnd_predict_i) for a given day (i) is the sum of the prediction value 504 for that day 502 (predict_i) and the cumulative error value 506 from the previous day (CE_i−1) rounded to the nearest integer. For example, at day 502 of "11/2/19", the prediction value 504 of 0.41 is added to the cumulative error value 506 from the previous day 502 of 0.13 to obtain 0.54. When rounded to the nearest integer, 0.54 gives the rounded prediction value 508 of one. Cumulative error values 506 (CE_i) are also determined for each of the i days. The cumulative error value 508 for a given day 502 is the difference between the sum of prediction values 504 for all days up to the day being predicted (sum(predict_1:predict_i)) minus the sum of rounded prediction values 508 for all days up to the day being predicted (sum(rnd_predict_1: rnd_predict_i)).

Table 500 also shows the total prediction value 512 for the prediction period as well as a total rounded value 514 for the new rounding process of this disclosure and the total rounded value 516 for the conventional rounding process. The total rounded value 514 of the improved rounding process of nine is approximately equal to the total prediction value 512 of 8.84. Indeed, in this example, the total rounded value 514 of nine correspond to the value achieved by rounding the total prediction value of 8.84 to the nearest integer (i.e., rounding 8.84 to the nearest integer gives nine). In other words, the sum of the integer values of the rounded prediction values 508 over the future period of time (from 11/1/19 to 11/14/19) corresponds to the sum of the non-integer values of the prediction value 504 rounded to the nearest integer value. Meanwhile, the total rounded value 516 of 4 for the conventional rounding approach is relatively far from the total prediction value 512 of 8.84. This shows that the rounded prediction values 508 more accurately retain the information from the prediction values 504 than was possible using the conventional rounding approach.

Operation of an Example Item Request Device

Figure 6:
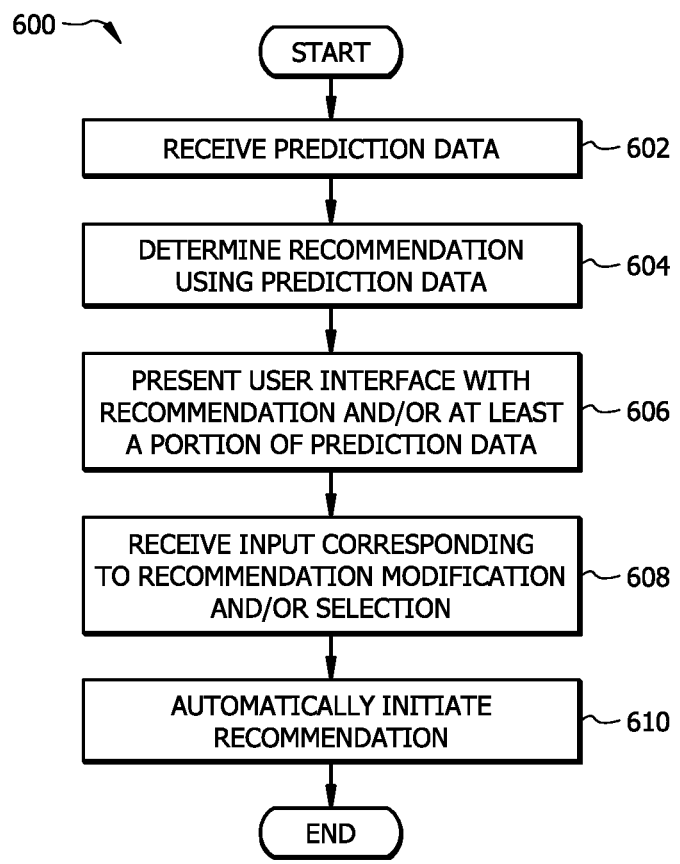
FIG. 6 is a flowchart illustrating an example method of using prediction data for implementing a proactive request.

FIG. 6 shows an example method 600 performed by an item request device 102 of FIG. 1 to present prediction data 114 and recommendation 116 and automatically implement actions based on a selected recommendation 116. Method 600 may be implemented using the processor 104, memory 106, and network interface 108 of the item request device 102. The method 600 may begin at step 602 where prediction data 114 is received by the item request device 102. The received prediction data 114 may have been requested through a call 122 for prediction data 114 associated with the location of the item request device 102.

At step 604, a recommendation 116 may is determined using the prediction data 114. As an example, the recommendation 116 may indicate a number of items to obtain to replace items anticipated to be removed from the location of the item request device 102 according to the prediction data 114.

Figure 7:
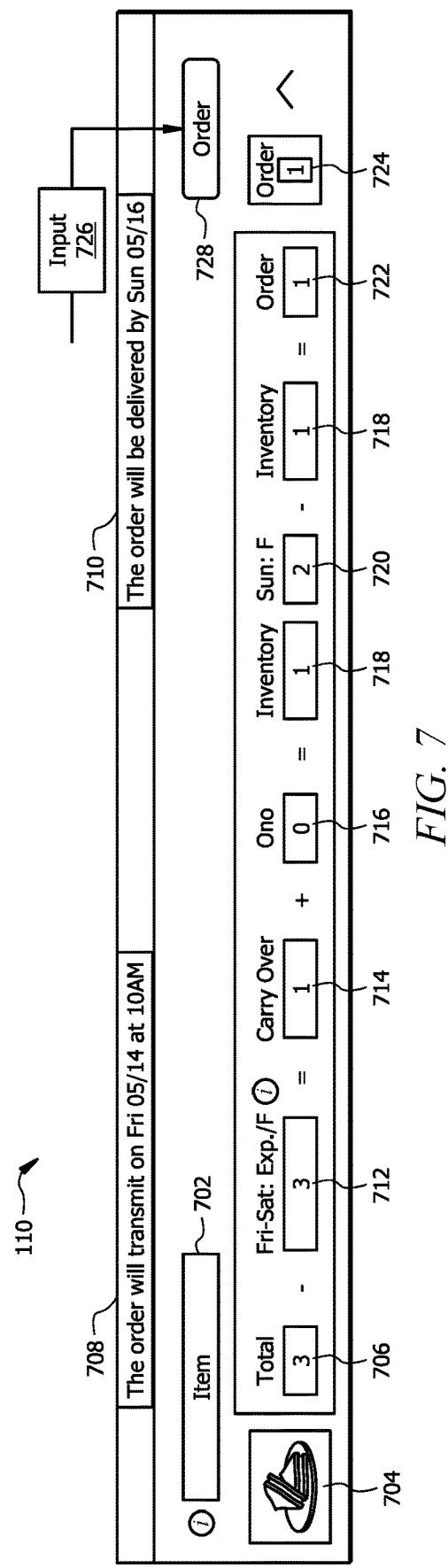
FIG. 7 is a diagram illustrating an example view of a user interface of an item request device of the system of FIG. 1.

At step 606, a user interface 110 is presented that displays at least a portion of the prediction data 114 and/or the recommendation 116 from step 604. An example of such a user interface 110 is shown in FIG. 7. In the example of FIG. 7, the user interface 110 presents information for proactively requesting an appropriate amount of an item 702 in a more efficient and reliable manner than was possible using previous technology. The user interface 110 may present an image 704 representing the item 702 to facilitate improved ease of use of the user interface 110. The user interface 110 displays a current amount 706 of the item 702 at the location of the item request device 102. The user interface 110 may also display a time 708 when a request for the item 702 will be transmitted and a time 710 when the item 702 is anticipated to be received at the location. In this example, the user interface 110 displays predicted removals 712 of the item 702 for the remainder of the current week. The predicted removals 712 may be included in the prediction data 114. The user interface 110 displays a carryover amount 714 at the end of the week and the amount of the item 702 already requested 716 (if any). The user interface 110 displays a predicted amount 720 corresponding to predicted removals of item 702 during one or more days in the next week. In this example, the predicted amount 720 is for a single day (Sunday) after the item 702 would be received. A recommended item amount 722 is determined as part of recommendation 116. The recommended item amount 722 is the predicted amount 720 for the time period (Sunday in this example) minus the anticipated amount 718. The recommended item amount 722, which may correspond to recommendation 116, is automatically populated into an editable field 724.

Referring again to FIG. 6, at step 608, the item request device 102 receives an input corresponding to selection and/or modification of the displayed recommendation 116. For example, referring back again to the example of FIG. 7, a user input 726 can be provided to modify field 724 and/or initiate an action to request the recommended item amount 722 for item 702 by selecting the action button 728. At step 610, an action is automatically initiated based on the selected recommendation 116. For instance, following selection of the action button 728, appropriate network communications may be initiated to send a request 140 for the amount of item 702 indicated in field 724 of FIG. 7. By presenting information (e.g., recommendation 116) based on improved prediction data 114, item 702 may be requested and provided more reliably and efficiently than was previously possible. For example, fewer network communications may be needed to send the request 140 for an accurate number of items (e.g., without repeating requests when a prediction underestimates an amount needed). Resources expended to plan and coordinate item transportation are also conserved through the more accurate prediction data 114. For example, computing resources used by the transportation management subsystem 142 to plan and coordinate transportation may be used more efficiently, and the resources used to transport items are used more efficiently.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
   at each of a plurality of locations, an item tracking subsystem configured to detect item removal events at the location of the plurality of locations;
   a data prediction subsystem comprising:
      a network interface configured to receive event data based on the item removal events detected at the plurality of locations, the event data indicating amounts of items removed from each of the plurality of locations over a previous period of time;

a memory operable to store the received event data; and a first processor communicatively coupled to the network interface and the memory, the first processor configured to:
  detect an anomalous activity with respect to the received event data, wherein the anomalous activity corresponds to an unexpected amount of item removal events that is greater than an expected number of item removal events according to a recent trend in the event data for the item;
  in response to detecting the anomalous activity, adjust the received event data by reducing the unexpected amount of item removal events according to the recent trend in the event data;
  train a prediction model on the event data, wherein training the prediction model comprises:
    determine an array of first moving averages by item and location, each of the first moving averages of the array comprising a weighted average of the amount of the item removed from a corresponding location of the plurality of locations each day during a previous time interval;
    determine a first weighting coefficient for the array of first moving averages based at least in part upon a correlation between the first moving averages and actual removal events for the item at the corresponding location;
    determine, using the array of first moving averages, second moving averages aggregated by item with respect to a plurality of items that belong to an item category to which the item belongs;
    determine a second weighting coefficient for the second moving averages based at least in part upon a correlation between the second moving averages and actual removal events for the item at one or more other locations within the plurality of locations;
    determine, using the array of first moving averages, third moving averages aggregated by location with respect to a plurality of items that belong to an item category to which the item belongs; and
    determine a third weighting coefficient for the third moving averages based at least in part upon a correlation between the array of third moving averages and actual removal events for the plurality of items; and
  determine a prediction data value for each item at each of the plurality of locations using a weighted combination of the first moving averages weighted by the first weighting coefficient, the second moving averages weighed by the second weighing coefficient, and the third moving averages weighted by the third weighing coefficient;
  for days where the item was not present at the corresponding location, determine an inferred event that indicates potential removal events that would have occurred when the item was present based at least in part upon anticipated removal event values and a number of consecutive days during which no removal events occurred while the item was not present at the corresponding location;
  update the determined prediction data based on the determined inferred event to account for the potential removal events for the item; and
  reduce a number of item transportation requests for the item based on the updated prediction data value as compared to a greater number of transportation requests for the item when the prediction data value was based only on removal events of the item recorded for the days where the item was not present at the corresponding location; and an item request device associated with a location of the plurality of locations, the item request device comprising a second processor configured to:
  receive the prediction data value associated with the location of the item request device;
  automatically populate the received prediction data value in a field in a user interface on a display; and
  in response to receiving the prediction data value, automatically communicate a request for a number of items based on the-received prediction data value.

2. The system of claim 1, wherein the weighted average of each of the first moving averages is weighted to provide increased weight to the amount of the item removed on more recent days in the previous time interval.

3. The system of claim 1, wherein the first processor is further configured to determine the previous time interval by:
  determining the amount of the item removed on each day during a first portion of a default time interval is zero; and
  after determining that the amount of the item removed during the first portion of the default time interval is zero, determining the previous time interval as a truncated portion of the default time interval.

4. The system of claim 1, wherein the first processor is further configured to determine the second moving averages by, for each location of the plurality of locations:
  determining an average of the first moving averages for a zone with which the location is associated;
  determining a coefficient for the location based on an item category; and
  determining the second moving average as a product of the average of the first moving averages for the zone with which the location is associated and the coefficient.

5. The system of claim 4, wherein the coefficient for the location is determined based on a sum of the first moving averages for items in the item category divided by an average of the first moving averages for the item category in the zone with which the location is associated.

6. The system of claim 1, wherein the first processor is further configured to determine the third moving averages by, for each location of the plurality of locations:
  determining an average of the first moving averages for an item category;
  determining a coefficient for the item category in a zone with which the location is associated; and
  determining the third moving average as a product of the average of the first moving averages for the item category and the coefficient.

7. The system of claim 6, wherein the coefficient for the item category is determined based on a sum of the first moving averages for the zone with which the location is associated divided by an average of the first moving averages for the item category in the zone.

8. The system of claim 1, wherein the first processor is further configured to, for each location of the plurality of locations, determine, using the prediction data value for the location and a day-of-the-week coefficient for each day-of-the-week, day-adjusted prediction values comprising the prediction data value weighted by the day-of-the-week for each day over a future period of time.

9. A method, comprising:
at each of a plurality of locations, detecting item removal events at the location using an item tracking subsystem;
receiving event data based on the item removal events detected at the plurality of locations, the event data indicating an amount of an item removed from each of the plurality of locations over a previous period of time;
detecting an anomalous activity with respect to the received event data, wherein the anomalous activity corresponds to an unexpected amount of item removal events that is greater than an expected number of item removal events according to a recent trend in the event data for the item;
in response to detecting the anomalous activity, adjusting the received event data by reducing the unexpected amount of item removal events according to the recent trend in the event data;
training a prediction model on the event data, wherein training the prediction model comprises:
determining an array of first moving averages by item and location, each of the first moving averages of the array comprising a weighted average of the amount of each item removed from a corresponding location of the plurality of locations each day during a previous time interval;
determining a first weighting coefficient for the array of first moving averages based at least in part upon a correlation between the first moving averages and actual removal events for the item at the corresponding location;
determining, using the array of the first moving averages, second moving averages aggregated by item with respect to a plurality of items that belong to an item category to which the item belongs;
determining a second weighting coefficient for the second moving averages based at least in part upon a correlation between the second moving averages and actual removal events for the item at one or more other locations within the plurality of locations;
determining, using the array of the first moving averages, third moving averages aggregated by location with respect to a plurality of items that belong to an item category to which the item belongs; and
determining a third weighting coefficient for the third moving averages based at least in part upon a correlation between the array of third moving averages and actual removal events for the plurality of items;
determining a prediction data value for the item at each of the plurality of locations using a weighted combination of the first moving averages weighted by the first weighting coefficient, the second moving averages weighed by the second weighing coefficient, and the third moving averages weighted by the third weighing coefficient;
for days where the item was not present at the corresponding location, determining an inferred event that indicates potential removal events that would have occurred when the item was present based at least in part upon anticipated removal event values and a number of consecutive days during which no removal events occurred while the item was not present at the corresponding location;
updating the determined prediction data based on the determined inferred event to account for the potential removal events for the item;
reducing a number of item transportation requests for the item based on the updated prediction data value as compared to a greater number of transportation requests for the item when the prediction data value was based only on removal events of the item recorded for the days where the item was not present at the corresponding location;
automatically populating the determined prediction data value in a field in user interface on a display; and
in response to receiving the prediction data value, automatically communicating a request for a number of items based on the received prediction data value.

10. The method of claim 9, wherein the weighted average of each of the first moving averages is weighted to provide increased weight to the amount of the item removed on more recent days in the previous time interval.

11. The method of claim 9, further comprising determining the previous time interval by:
determining the amount of the item removed on each day during a first portion of a default time interval is zero; and
after determining that the amount of the item removed during the first portion of the default time interval is zero, determining the previous time interval as a truncated portion of the default time interval.

12. The method of claim 9, further comprising determining the second moving averages by, for each location of the plurality of locations:
determining an average of the first moving averages for a zone with which the location is associated;
determining a coefficient for the location based on an item category; and
determining the second moving average as a product of the average of the first moving averages for the zone with which the location is associated and the coefficient.

13. The method of claim 12, wherein the coefficient for the location is determined based on a sum of the first moving averages for items in the item category divided by an average of the first moving averages for the item category in the zone with which the location is associated.

14. The method of claim 9, further comprising determining the third moving averages by, for each location of the plurality of locations:
determining an average of the first moving averages for an item category;
determining a coefficient for the item category in a zone with which the location is associated; and
determining the third moving average as a product of the average of the first moving averages for the item category and the coefficient.

15. The method of claim 14, wherein the coefficient for the item category is determined based on a sum of the first moving averages for the zone with which the location is associated divided by an average of the first moving averages for the item category in the zone.

16. The method of claim 9, further comprising, for each location of the plurality of locations, determining, using the prediction data value for the location and a day-of-the-week coefficient for each day-of-the-week, day-adjusted prediction values comprising the prediction data value weighted by the day-of-the-week for each day over a future period of time.

17. A data prediction subsystem comprising:
a network interface configured to receive event data based on item removal events detected at each of a plurality of locations, the event data indicating amounts of items removed from each of the plurality of locations over a previous period of time;
a memory operable to store the received event data; and
a processor communicatively coupled to the network interface and the memory, the processor configured to:
   detect an anomalous activity with respect to the received event data, wherein the anomalous activity corresponds to an unexpected amount of item removal events that is greater than an expected number of item removal events according to a recent trend in the event data for the item;
   in response to detecting the anomalous activity, adjust the received event data by reducing the unexpected amount of item removal events according to the recent trend in the event data;
   train a prediction model on the event data, wherein training the prediction model comprises:
      determine an array of first moving averages by item and location, each of the first moving averages of the array comprising a weighted average of the amount of the item removed from a corresponding location of the plurality of locations each day during a previous time interval;
      determine a first weighting coefficient for the array of first moving averages based at least in part upon a correlation between the first moving averages and actual removal events for the item at the corresponding location;
      determine, using the array of first moving averages, second moving averages aggregated by item with respect to a plurality of items that belong to an item category to which the item belongs;
      determining a second weighting coefficient for the second moving averages based at least in part upon a correlation between the second moving averages and actual removal events for the item at one or more other locations within the plurality of locations;
      determine, using the array of first moving averages, third moving averages aggregated by location with respect to a plurality of items that belong to an item category to which the item belongs; and
      with respect to a plurality of items that belong to an item category to which the item belongs;
   determine a prediction data value for each item at each of the plurality of locations using a weighted combination of the first moving averages weighted by the first weighting coefficient, second moving averages weighed by the second weighing coefficient, and third moving averages weighted by the third weighing coefficient;
   for days where the item was not present at the corresponding location, determine an inferred event that indicates potential removal events that would have occurred when the item was present based at least in part upon anticipated removal event values and a number of consecutive days during which no removal events occurred while the item was not present at the corresponding location;
   update the determined prediction data based on the determined inferred event to account for the potential removal events for the item; and
   reduce a number of item transportation requests for the item based on the updated prediction data value as compared to a greater number of transportation requests for the item when the prediction data value was based only on removal events of the item recorded for the days where the item was not present at the corresponding location.

18. The data prediction subsystem of claim 17, wherein the weighted average of each of the first moving averages is weighted to provide increased weight to the amount of the item removed on more recent days in the previous time interval.

19. The data prediction subsystem of claim 17, wherein the processor is further configured to determine the previous time interval by:
   determining the amount of the item removed on each day during a first portion of a default time interval is zero; and
   after determining that the amount of the item removed during the first portion of the default time interval is zero, determining the previous time interval as a truncated portion of the default time interval.

20. The data prediction subsystem of claim 17, wherein the processor is further configured to determine the second moving averages by, for each location of the plurality of locations:
   determining an average of the first moving averages for a zone with which the location is associated;
   determining a coefficient for the location based on an item category; and
   determining the second moving average as a product of the average of the first moving averages for the zone with which the location is associated and the coefficient.

21. The data prediction subsystem of claim 20, wherein the coefficient for the location is determined based on a sum of the first moving averages for items in the item category divided by an average of the first moving averages for the item category in the zone with which the location is associated.

22. The data prediction subsystem of claim 17, wherein the processor is further configured to determine the third moving averages by, for each location of the plurality of locations:
   determining an average of the first moving averages for an item category;
   determining a coefficient for the item category in a zone with which the location is associated; and
   determining the third moving average as a product of the average of the first moving averages for the item category and the coefficient.

23. The data prediction subsystem of claim 22, wherein the coefficient for the item category is determined based on a sum of the first moving averages for the zone with which the location is associated divided by an average of the first moving averages for the item category in the zone.

24. The data prediction subsystem of claim 17, wherein the processor is further configured to, for each location of the plurality of locations, determine, using the prediction data value for the location and a day-of-the-week coefficient for each day-of-the-week, day-adjusted prediction values comprising the prediction data value weighted by the day-of-the-week for each day over a future period of time.

* * * * *